(12) United States Patent
Post et al.

(10) Patent No.: US 10,669,097 B2
(45) Date of Patent: Jun. 2, 2020

(54) ZONELESS PICK METHOD AND SYSTEM WITH OPERATOR DATA TRACKING

(71) Applicant: Dematic Corp., Grand Rapids, MI (US)

(72) Inventors: Tim Post, Grand Rapids, MI (US); Jon Van Hekken, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 58 days.

(21) Appl. No.: 16/034,733

(22) Filed: Jul. 13, 2018

(65) Prior Publication Data

US 2019/0016533 A1    Jan. 17, 2019

Related U.S. Application Data

(60) Provisional application No. 62/531,947, filed on Jul. 13, 2017.

(51) Int. Cl.
*B65G 1/137*    (2006.01)
*G06Q 10/08*    (2012.01)

(52) U.S. Cl.
CPC .......... *B65G 1/1376* (2013.01); *B65G 1/137* (2013.01); *B65G 1/1373* (2013.01); *G06Q 10/087* (2013.01); *B65G 2201/0258* (2013.01)

(58) Field of Classification Search
CPC .................................................. B65G 1/1376
See application file for complete search history.

(56) References Cited

U.S. PATENT DOCUMENTS

| 3,247,929 | A | * | 4/1966 | Langley | B65G 1/1376 186/56 |
| 3,661,284 | A | * | 5/1972 | Traube | B65G 1/1378 414/800 |
| 4,792,273 | A | * | 12/1988 | Specht | G08B 5/36 414/807 |
| 5,509,538 | A | * | 4/1996 | Spindler | B65G 1/1376 209/630 |
| 5,943,841 | A | * | 8/1999 | Wunscher | B65G 1/1376 414/268 |
| 6,762,681 | B1 | * | 7/2004 | Danelski | B65G 1/137 340/568.1 |
| 2002/0087231 | A1 | * | 7/2002 | Lewis | B65G 1/1373 700/230 |
| 2004/0247421 | A1 | * | 12/2004 | Saunders | B65G 1/137 414/500 |

(Continued)

*Primary Examiner* — Thomas Randazzo
(74) *Attorney, Agent, or Firm* — Gardner, Linn, Burkhart & Ondersma LLP

(57) ABSTRACT

A zoneless pick-to-light method and system initially inducts a group of totes into an initial picking station by scanning a tote identifier for each tote in the group. A product order is assigned to each tote in the inducted group of totes, such that matching a product in the picking station with the order causes a light to be illuminated adjacent to the corresponding product needed to fulfill the order. A user scans a personal identification and picks and places the desired quantity of the product to fulfill the product order for each tote at the station. The group of totes are moved in a flow direction to an adjacent picking station, where the user can elect to either follow the group of totes to the adjacent downstream picking station or abandon the group of totes, such that a different user may complete the product orders for the group of totes.

36 Claims, 8 Drawing Sheets

(56) References Cited

U.S. PATENT DOCUMENTS

2005/0278062 A1* 12/2005 Janert .................... G06Q 10/08
 700/214
2015/0081088 A1* 3/2015 Lyon .................. G06Q 10/0875
 700/216
2016/0101940 A1* 4/2016 Grinnell ............... B65G 1/1373
 700/216

* cited by examiner

ZONELESS PICK METHOD AND SYSTEM
WITH OPERATOR DATA TRACKING

CROSS REFERENCE TO RELATED
APPLICATIONS

This application claims priority from U.S. patent application Ser. No. 62/531,947, filed on Jul. 13, 2017, the disclosure of which is hereby incorporated herein by reference in its entirety.

FIELD OF THE INVENTION

The present invention generally relates to a zoneless pick method and system, and more particularly to a pick-to-light technique that permits filling of a large quantity of orders of different products. While the invention finds application in an order fulfillment method and system, it is not limited to such an application.

BACKGROUND OF THE INVENTION

Conventional picking techniques organize products to be picked in rows and columns, with the products supported in boxes or containers, for example, in flow racks. Pickers or operators may be prompted by indicators, such as lights in pick-to-light systems, which are illuminated to indicate which product is to be picked and the quantity to be picked. In response to the indicator or light, the operators may pick and place a product in a box or tote or the like that is supported in front of the flow rack. Once the product is picked, the operator may then press a button to indicate that the pick is complete, which deactivates the light. The totes are typically supported on a roller conveyor so that when picks are complete for a flow rack, the operator can move the tote to the next flow rack. After the picks are complete for a given flow rack and the tote has been moved down to the next flow rack, the process will be repeated for the next tote. Typically, when all the products in all a picking zone are picked, the operator then initiates the next order.

SUMMARY OF THE INVENTION

The present zoneless pick method and system is operated by allowing operators or pickers or users to freely respond to changes in product order demand concentrations along a given product picking aisle or arrangement, such as to permit pickers to abandon totes at a particular zone and work upstream or downstream along an arrangement of picking stations. This allows pickers to address bottlenecks and delays that can be caused in conventional picking systems by a downstream operator not completing his or her pick for their assigned picking zone. As a result, it has been found that operators in conventional system often cannot work at their optimum level and have downtimes when no articles are being picked. Therefore, slower pickers tend to dictate the pick rate for all the pickers in an aisle or arrangement. Along with the permitted free movement of pickers, among other features, the present zoneless pick system also allows for the seamless addition or subtraction of pickers from a picking aisle or arrangement, without the readjustment of zones or software.

According to one aspect of the invention, a method of picking products in a pick system includes inducting a group of totes to an initial station of an arrangement of picking stations. At least a portion of a product order is assigned to at least one tote in the inducted group of totes. In response to the product order of the group of totes identifying a product in a picking station where the group of totes is located, the product is indicated to be picked. The group of totes is moved in a flow direction along the arrangement of picking stations from the initial picking station to downstream adjacent picking stations. A user is identified at a picking station. The user picks to a group of totes as that group moves along the flow direction until that user abandons that group of totes by identifying a different user for that group of totes.

According to another aspect of the invention, a pick system includes an arrangement of picking stations that have a plurality of products available for picking. A group of totes are each configured to be moved in a flow direction along the arrangement of picking stations from an initial picking station to downstream adjacent picking stations. A controller is configured to induct the group of totes to an initial station in the arrangement of picking stations by identifying at least one tote in the group and assigning at least a portion of a product order to the group. The controller is also configured to indicate a product at a picking station in response to the controller identifying the product from the product order of group of totes located at the picking station. The controller is further configured to identify a user with a group of totes at a picking station and successive downstream adjacent picking stations for that group until a different user is identified at that group of totes or that user is identified at a different group of totes.

According to yet another aspect of the invention, a method of picking products in a pick system includes inducting a group of totes to an initial station of an arrangement of picking stations. At least a portion of a product order is assigned to at least one tote in the inducted group of totes. A product is indicated to be picked in response to the product order of the group of totes identifying the product in a picking station where the group of totes is located. The group of totes is moved in a flow direction along the arrangement of picking stations from the initial picking station to downstream adjacent picking stations. A user is identified at a picking station. In response to the user indicating to audit a tote in the group of tote, at least a portion of the product order of the tote is displayed for the user to inspect the contents of the tote and adjust the product contents as necessary to comply with the displayed product order.

According to another aspect of the invention, a pick system includes an arrangement of picking stations that have a plurality of products for picking. A group of totes are each configured to be moved in a flow direction along the arrangement of picking stations from an initial picking station to downstream picking stations. A controller is configured to induct the group of totes to an initial station in the arrangement of picking stations by identifying at least one tote in the group and assigning at least one product order to the group. The controller is configured to indicate a product at a picking station in response to the controller identifying the product from the product order of group of totes located at the picking station. The controller is configured to identify a user with a group of totes at a picking station. A display at the picking station is in communication with the controller and is configured, in response to the user indicating to audit a tote in the group of totes, to display at least a portion of the product order of the tote for the user to inspect the contents of the tote and adjust the product contents as necessary to comply with the displayed product order.

According to yet another aspect of the invention, at least one row of products are disposed in adjacent picking stations, where a set of products are available for picking in each picking station. A group of totes are inducted to an initial picking station by scanning a tote identifier for each tote in the group. A product order is assigned to each tote in the inducted group of totes. In response to the product order assigned to the tote matching a product from the set of products at the picking station at which the tote is located, a light is illuminated adjacent to the corresponding product for alerting a picker of the product to fulfill the product order. A first user identification is scanned at a picking station that is associated with a location of a first picker. The first picker picks and places the desired quantity of the product to fulfill the product order at the picking station for each tote in the group of totes. When the order for each tote in the group of totes is fulfilled or does not match any of the products at the picking station, the group of totes are moved in a flow direction along the row of products away from the initial picking station to an adjacent picking station. The group of totes are registered at the adjacent picking station by scanning at least one tote identifier in the group of totes. The first picker elects to either follow the group of totes along the flow direction of the group of totes to the adjacent picking station or abandon the group of totes to scan the first user identification at another picking station to induct a new group of totes or pick and fulfill a product order for another group of totes. When the first picker elects to abandon the group of totes, a second picker may scan a second user identification at the adjacent picking station to pick and fulfill the product order for the group of totes.

Thus, when the order for each tote in the group of totes is fulfilled or does not match any of the products at a picking station, each group of totes is permitted to move in the flow direction along the arrangement of products, until the group encounters a picking station that is occupied by a group of totes. To distribute the picking work, the pickers may follow a group of totes in the flow direction or abandon the group of totes and walk against or with the flow direction of the totes to upstream or downstream groups of totes, such as to address groups of totes that have illuminated picking orders that need to be fulfilled. Such free election by the pickers allows the real-time order picking balance between any number of operators or pickers with no external supervision, software changes, or loss of productivity. The cooperative and zoneless work provided by this picking system may be further encouraged by its optional ability to record and track picker data, such as individual metrics and overall productivity metrics, so as to be able to reward pickers that efficiently respond to such flow bottlenecks or stoppages. Likewise, this data recording by the system allows product orders to be audited in on-the-fly by any operator, so as to improve order fulfillment quality and timeliness.

These and other objects, advantages and features of this invention will become apparent upon review of the following specification in conjunction with the drawings.

DETAILED DESCRIPTION OF THE PREFERRED EMBODIMENTS

Figure 1:
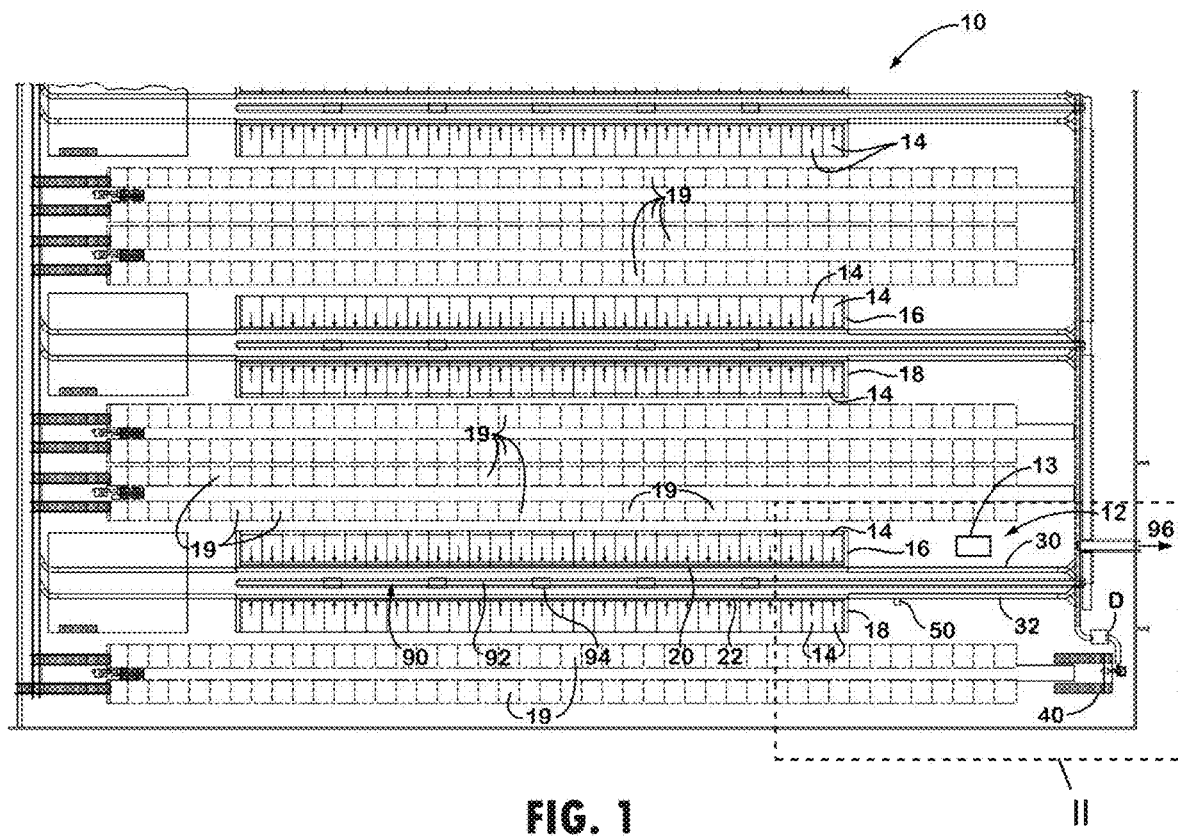
FIG. 1 is a plan view of a pick system, according to an embodiment of the invention.

Referring now to the drawings and the illustrative embodiment depicted therein, a zoneless pick system 10 (FIGS. 1-5) and method 100 (FIGS. 6A-6C) is provided that, among other features, encourages operators or pickers or users to freely respond to changes in product order demand concentrations along a given product picking aisle or arrangement. Initially, a picker will induct a group or cluster of totes into an initial picking station by scanning a tote identifier or otherwise identifying each tote in the group. The group of totes is shown as a group of three totes; however, it is understood that a single tote or more or fewer totes may be inducted at a time in a given group or cluster. A product order is thereby assigned to each tote in the inducted group of totes that are place on a supportive and preferably moveable surface that extends along the picking aisle or arrangement.

When a product in the picking station corresponds with the order of a tote on the supportive surface in front of the picking station, an indicator is provided to the picker, such as a light being illuminated adjacent to the corresponding product needed to fulfill the order and a display being illuminated to show the quantity of product required. A picker can respond to pick and fulfill the indicated order by scanning an identification or otherwise identifying themselves to the system and then proceeding to picks and places of the desired quantity of the product to fulfill the product order for each tote at the station. The group of totes are moved in a flow direction to an adjacent picking station, where the picker can elect to either follow the group of totes to the adjacent picking station or abandon the group of totes, such that another picker may complete the product orders for the group of totes moving downstream. Such free election by the pickers allows the real-time order picking balance between any number of operators or pickers. Although illustrated herein with human pickers, it is understood that the operators or pickers or users that at least partially operate the pick system described herein may be human and/or robotic.

Figure 2:
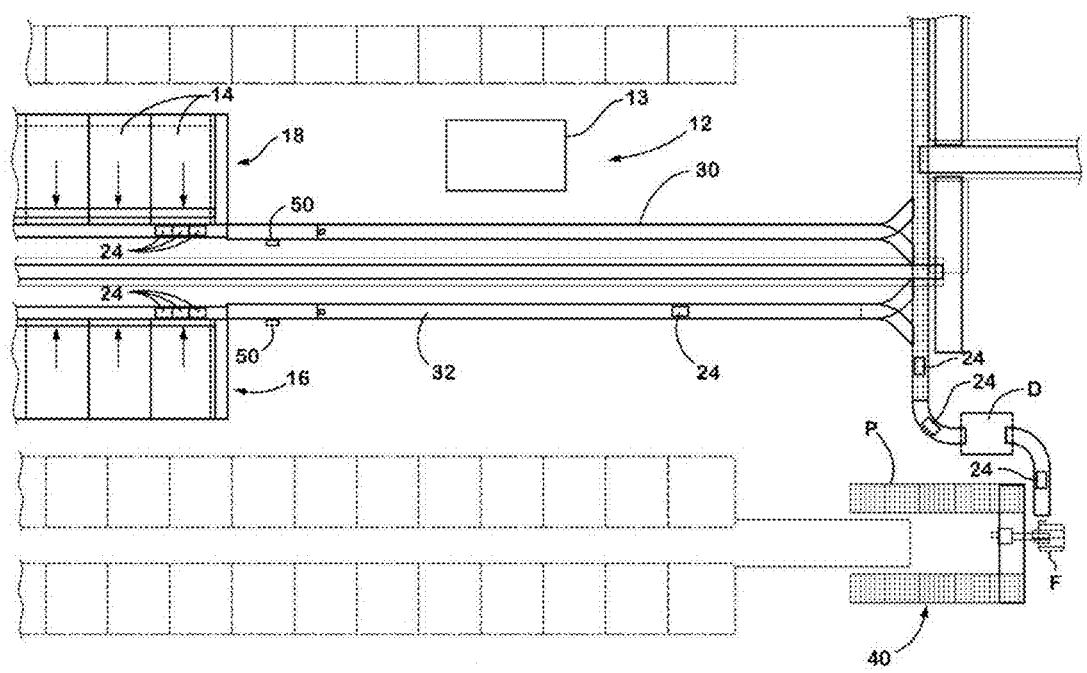
FIG. 2 is an enlarged partial view taken at section II of the pick system shown in FIG. 1.

As shown in FIGS. 1 and 2, the pick system 10 includes a control system 12 which controls the operation of the pick system 10, including the generation and assignment of product orders to totes being inducted into the system, along with the light indications and order fulfillment process of the system. Thus, the control system 12 allows operators or pickers to continuously pick and to pick at a rate that is independent of the picking rate of other operators. The control system 12 includes a central controller 13 and a plurality of modules that permit communication between the operators of the pick system 10 and the controller 13, such that operators can work at his or her full capacity to thereby increase the throughput of the pick system, as will be more fully described below.

The pick system 10, such as shown in FIGS. 1-5, includes a plurality of picking bays or stations 14 that are shown arranged in spaced apart linear arrangements or rows 16, 18, defining a picking aisle between the rows. Although shown in FIG. 1 as two rows of picking bays and one aisle, it is appreciated that the arrangement of picking stations may be alternatively shaped or configured, such as in a single row of picking bays or stations so as to similarly define a picking aisle. The picking aisle preferably provides sufficient open space for operators to move between the picking bays or stations so that the operators are not limited to a specific zone or specific set of picking bays or stations.

Each bay or station 14 may be a conventional case flow rack, which includes a frame and a plurality of vertically spaced shelves that are supported by the frame and that may include a plurality of rollers. Each shelf may be canted or tilted so that products placed on the rollers forming the shelf will flow to one side of the shelf. The lower side of the shelves are typically aligned along a discharge side of the station, while the higher side of the shelves are aligned along an induct side of the station. Products may be delivered by pallets and are placed on pallet racks 19, positioned behind the picking stations 14. The products are typically delivered in containers or boxes, which are delivered to the picking stations from the induct side and then opened by an operator to be placed on the picking station from the induct side. Thus, the system provides at least one row of products disposed in adjacent picking stations, where a set of products are available for picking in each picking station. Other options are available, such as the use of automated replenishment, as disclosed in commonly assigned U.S. Pat. No. 9,522,781, the disclosure of which is incorporated herein by references in its entirety.

In addition, the pick system 10 includes a tote support surface disposed adjacent to the discharge sides of bays 14. The tote support surface may include a movable surface, such as rollers, a bearing surface, or conveyors 20, 22 (FIGS. 1-5) or the like that are used to support and allow for the movement and alignment of totes 24 in front of or adjacent to the discharge sides of the stations to provide receptacles for the products of an order (or of a partial order). Thus, the lower sides of the flow racks are adjacent a respective tote support surface so that when a product is placed on a respective shelf of a flow rack, the product will, under the force of gravity, move toward the discharge side of the station adjacent the respective tote support surface where the product can be picked and placed into a designated tote.

Optionally, when the tote support surface is provided with conveyors 20, 22, such conveyors may be selectively actuated by the control system 12 to index the totes between the respective bays, such as when the conveyors 20, 22 are conventional driven belt conveyors, with the belts supported by rollers. It should further be understood that other types of bays or conveyors may be used in the present application. As such, it is contemplated that conveyors 20 and 22 may be automatically driven or actuated to index the totes along the picking aisle adjacent the discharge sides of the respective picking stations.

Figure 3:
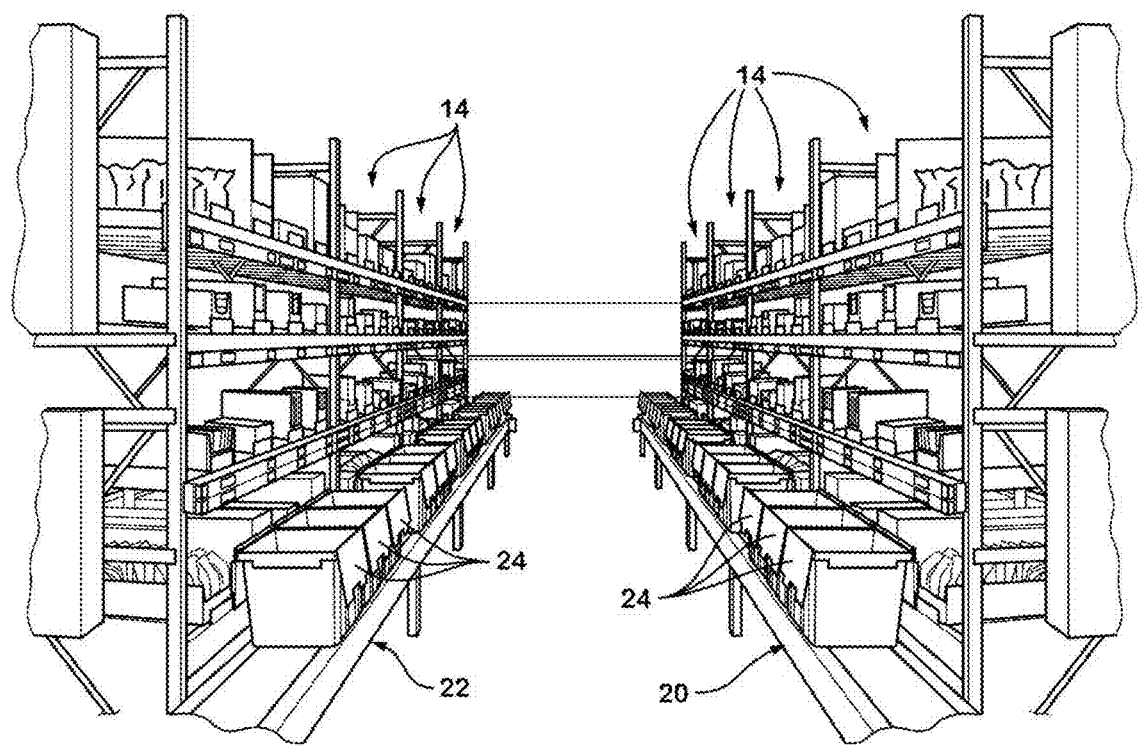
FIG. 3 is a perspective view of a picking aisle with two rows of picking stations of the pick system shown in FIG. 1.
Figure 4:
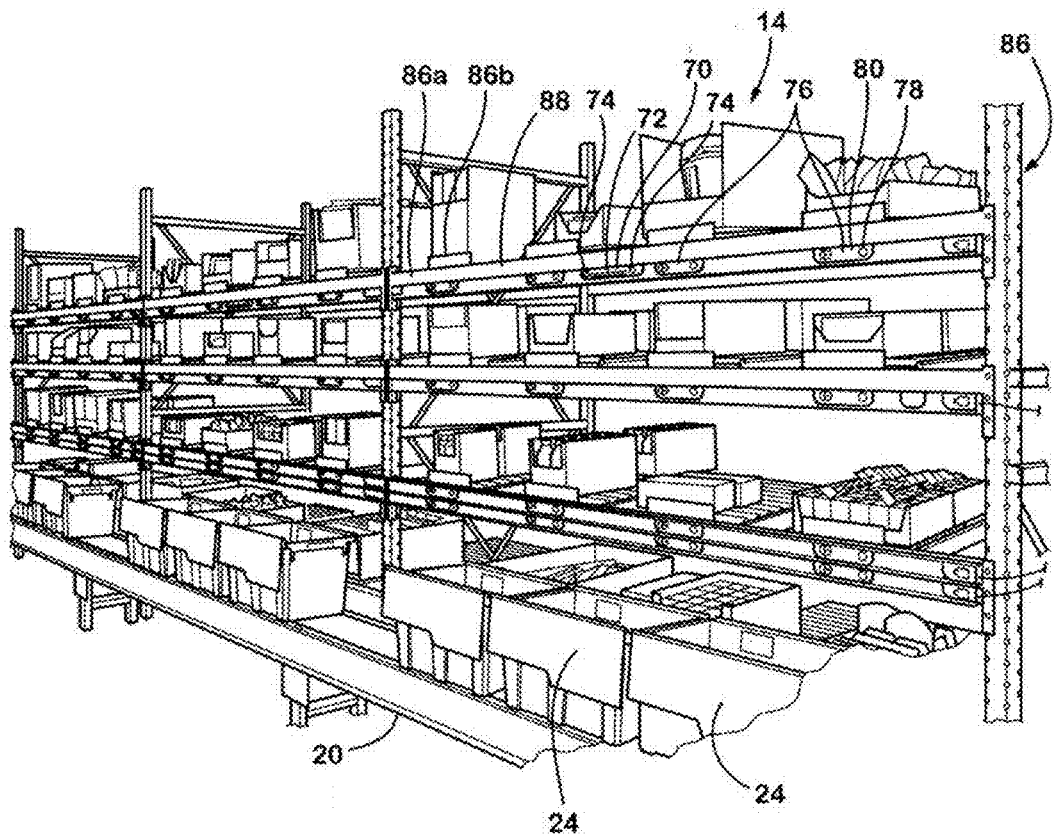
FIG. 4 is a perspective view of three picking stations of the pick system of the pick system shown in FIG. 1.
Figure 5:
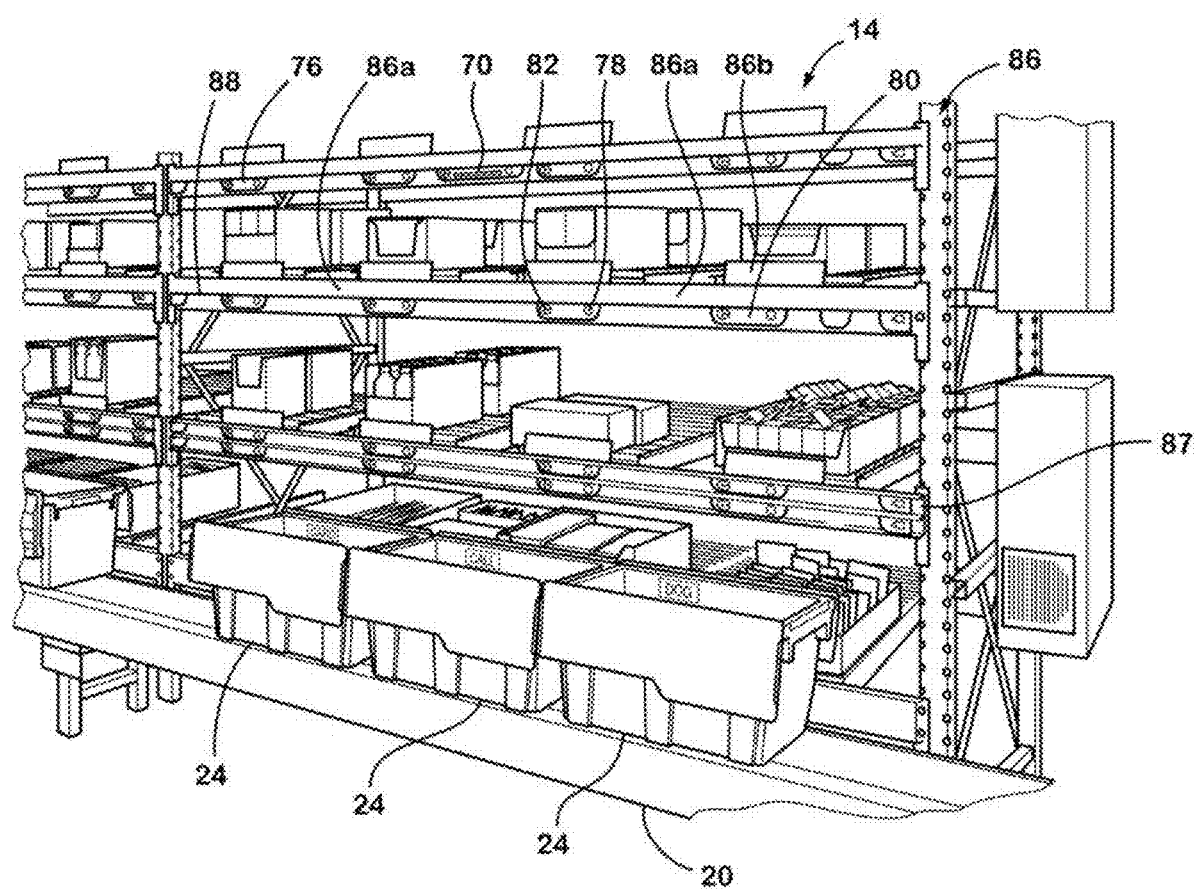
FIG. 5 is an enlarged perspective view illustrating one picking bay of the pick system shown in FIG. 1.

The term "tote" is used to refer to any receptacle including tray, shipping container, or the like. The totes 24 illustrated in FIGS. 3-5 are conventional plastic totes that have top cover flaps that can be moved to the illustrated open position to expose the receptacle of the tote. The operator manually or with autonomous assistance, such as a de-stacker device, moves the totes on to the tote support surface adjacent to an initial picking station. Optionally, as shown in FIGS. 1 and 2, the totes 24 may be delivered to the pick system area in stacks, which may be handled using pallets. For example, the pallets P may be conveyed on a pallet conveyor to tote handling area 40. The tote handling area 40 may include a de-stacker D, which automatically singulates the totes and delivers to totes to conveyors 30 and 32, which deliver the totes to the respective conveyors (20 and 22) of the respective row of picking bays.

In preferred form, each tote 24 includes a unique identification, such as an identification label with a barcode or a radio frequency identification (RFI) device or tag or the like, which is read by control system 12 and is associated by control system 12 with an order. When the totes are delivered to the tote support surface adjacent to the initial picking station, the identification on the respective totes is read or scanned, for example by optical readers 50, which are positioned adjacent roller conveyors 30 and 32 and are also in communication with controller 13.

Figure 6A:
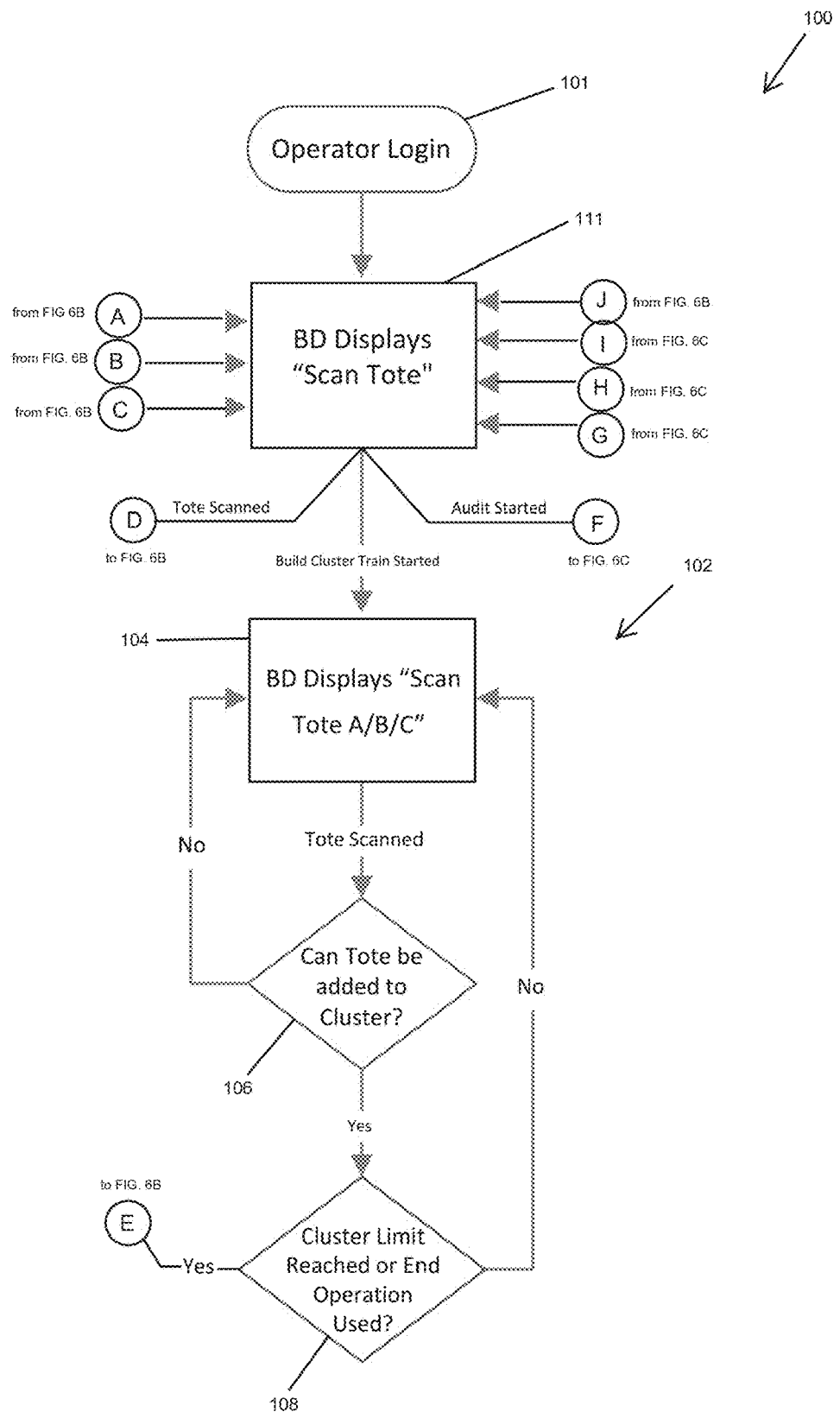
FIG. 6A is a flow chart of an induction process of the pick system.

A process 100 of operating the system 10 is illustrated in FIG. 6A and shows an induction process 102 for initializing a group of totes. Preferably, prior to an operator inducting or scanning any totes, at step 101 the operator or picker is identified to or logged into the system, such as by scanning a user identification card or badge or the like, which thereby associates the operator with the work being done at that particular picking station. Upon the operator logging into the system, at step 111, the display prompts the user to "scan tote," which may be done for various purpose. For example, with the induction process 102, the system first inducts or initializes a group of totes to the initial picking station by identifying or scanning a unique tote identifier for each tote in the group initially transferred to or placed at the initial picking station. This group of totes may also be referred to as a cluster train, in reference to the linear alignment of the totes as they move in a flow direction down the row of picking stations. Specifically, at step 104, the operator is prompted to scan a tote "A/B/C," as the group or cluster is either not yet started or not yet complete. Once scanned, the system at step 106 determines whether the tote can be added to the cluster, such as whether the tote is of the correct size and type to be added to the group. If it is determined that the tote is acceptable, the system at step 108 determines whether the group or cluster limit, such as three, has been reached with this added tote. If it has, the system proceeds to a picking fulfillment process 110. Again, the group or cluster of totes shown in FIGS. 2-5 are a group of three totes; however, it is understood that a single tote, two totes, or more totes may be inducted at a time in a given group or cluster. As the totes are scanned and accepted, a product order is assigned to each tote in the inducted group of totes.

While each tote is uniquely identified and identifiable to the control system 12 by, for example, the identification label, an RFI chip, or the like, the totes are also preferably marked with an identifier that is identifiable to the operator and, further, is encoded, for example, into the identification label read by control system 12. For example, referring to FIG. 5, each tote of the group of totes may be identified by a name or other identifier, such that the control system can direct the operator to remove product from the picking bay to place into a designated tote of the group of totes, as will be more fully explained below.

Figure 6B:
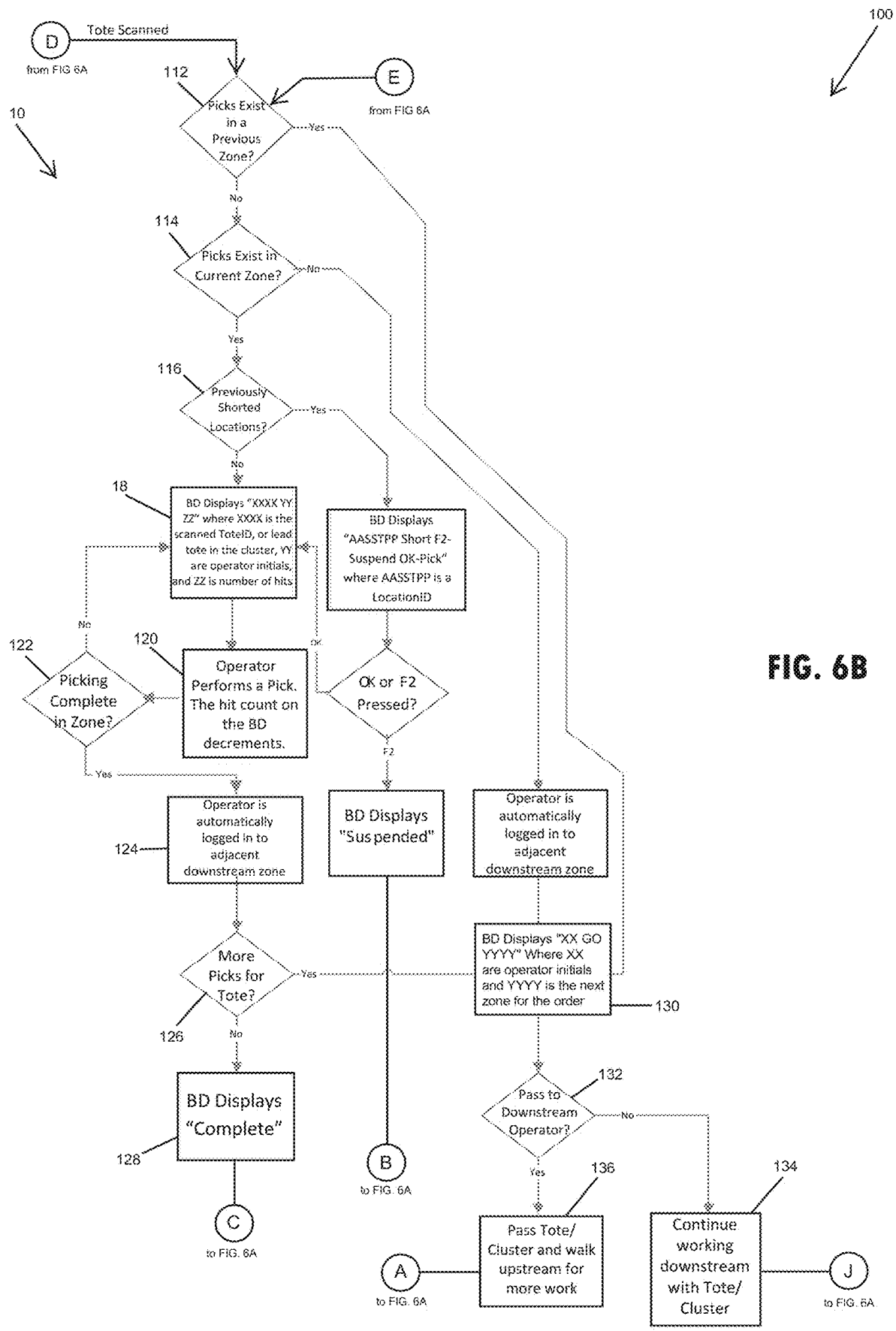
FIG. 6B is a flow chart of a picking fulfillment process of the pick system.

Once the control system has initialized or inducted a group of totes, the picking fulfillment process 110 first confirms, such as at step 112 shown in FIG. 6B, that the group is at the first picking station or otherwise that the previous picking station did not have any picks for the orders of the totes in the group. Once this is confirmed, at step 114, the system determines whether any picks exist in the current zone or picking station. Thus, in response to the product order assigned to a tote in the group matching a product from the set of products at the picking station at which the tote is located, an indicator, such as an illuminated light, is provided adjacent to the corresponding product for alerting a picker of the product to fulfill the product order. Before displaying the picking information and alert to the picker, the system may, at step 116, also confirm that there are no orders in previous or upstream stations that were not fulfilled or otherwise shorted.

As shown in FIGS. 4 and 5, each picking station 14 includes a station display module 70, which includes a display and one or more buttons to permit communication between the operator and control system 12. The display module 70 displays the identification, such as the name, of the tote to be filled with the product. To designate a specific product at the picking station, each product preferably includes a pick module 76 associated with each group of products. Products are arranged in rows that extend across a respective shelf from the induct side to the discharge side of the bay. Each pick module 76 is illustrated to include at least one light 78 that is actuated by the control system 12 to designate that a product associated with the pick module 76 must be picked from that particular row of products and placed into the tote identified by station display module 70. Optionally, each pick module 76 may include a display 80 to display the number or quantity of the particular product that needs to be placed into the designated tote.

Optionally, the front of the transverse frame members of each shelf of a flow rack may have power channels 88 to which pick modules 76 and bay modules 70 are mounted, such as shown in FIG. 5. Each power channel 88 comprises a channel member with elongate grooves that extend along the channel member. Insulated low voltage wiring extends along each of the grooves, with the wiring preferably captured in the grooves. The wiring is in communication with controller 13 of control system 12 to provide power to and communication with modules 70 and 76. Each bay module 70 and pick module 76 includes circuitry to power and provide communication to the respective displays and buttons provided on the modules, which are preferably mounted on a circuit board for ease of assembly. Each module further includes leads coupled to the module circuitry, which are adapted to be inserted into the insulated low voltage wiring to thereby couple the respective modules to controller 13 of control system 12. Furthermore, the leads are adapted to permit the respective modules to be unplugged from the insulated wire and reinserted in the insulated wire at another location so that the modules can be relocated along the power channels Referring again to FIG. 6A, the display module or pick module, at step 118, may display the tote identification, the operator's identity, and the number of hits or product matches within the given picking station. Thus, the operator can confirm that they have logged in or scanned in their identity before completing any picks. In order to signal to the control system 12 that a pick is complete, the pick module 76 may include one or more buttons 82 that permit the operator to indicate when the order fulfillment for that particular product has been complete for the designated tote. When the operator presses the button after each pick, at step 120, the displayed hit count is reduced to reflect the completed pick. Also, the illuminated light next to the product that was picked is no longer illuminated. At step 122, the system determines whether any other picks remain.

Once all the picks have been completed for each tote in the group of totes for a particular picking station 14, at step 124 the control system 12 automatically logs the operator into the next picking station, such that the operator can move the totes downstream to the next picking station, provided the orders for the downstream totes have also been completed at their respective picking station. It is also conceivable that the control system may automatically actuate a conveyor carrying the totes to index the group of totes to the next station. At step 126, the system determines whether there are more picks or products in the order that still need to be fulfilled. If not, the system at step 128 simply displays "complete" on the display module where the totes are located. If picks or products remain in the order for any of the totes in the group, at step 130 the display may display the next sequential picking zone or station where a product is located to fulfill at least a part of the order.

If products remain to be filled for the group of totes, the operator can decide to continue working downstream with the group of totes to the next picking station that has products correlating with the orders of the group of totes, as noted at step 134. When the totes are moved to another station, at least one tote identifier in the group of totes may be scanned to register the group of totes at the new picking station (step 111). Alternatively, the picker may decide at step 132 to pass the previously picked totes downstream to another picker and walk upstream to get more work (step 136), whether that is an existing inducted group of totes or the picker inducts a new group of totes to process orders. Again, when the picker approaches a new picking station, the picker scans his or her identification to log into that station. In this manner, operators may move between the respective picking stations, which enables operators to continue picking and, therefore, maximize the throughput of the pick system. After all the desired products for an order have been fulfilled for a group of totes, the totes may be moved or indexed from the last picking bay to be conveyed or taken away to a shipping area.

Figure 6C:
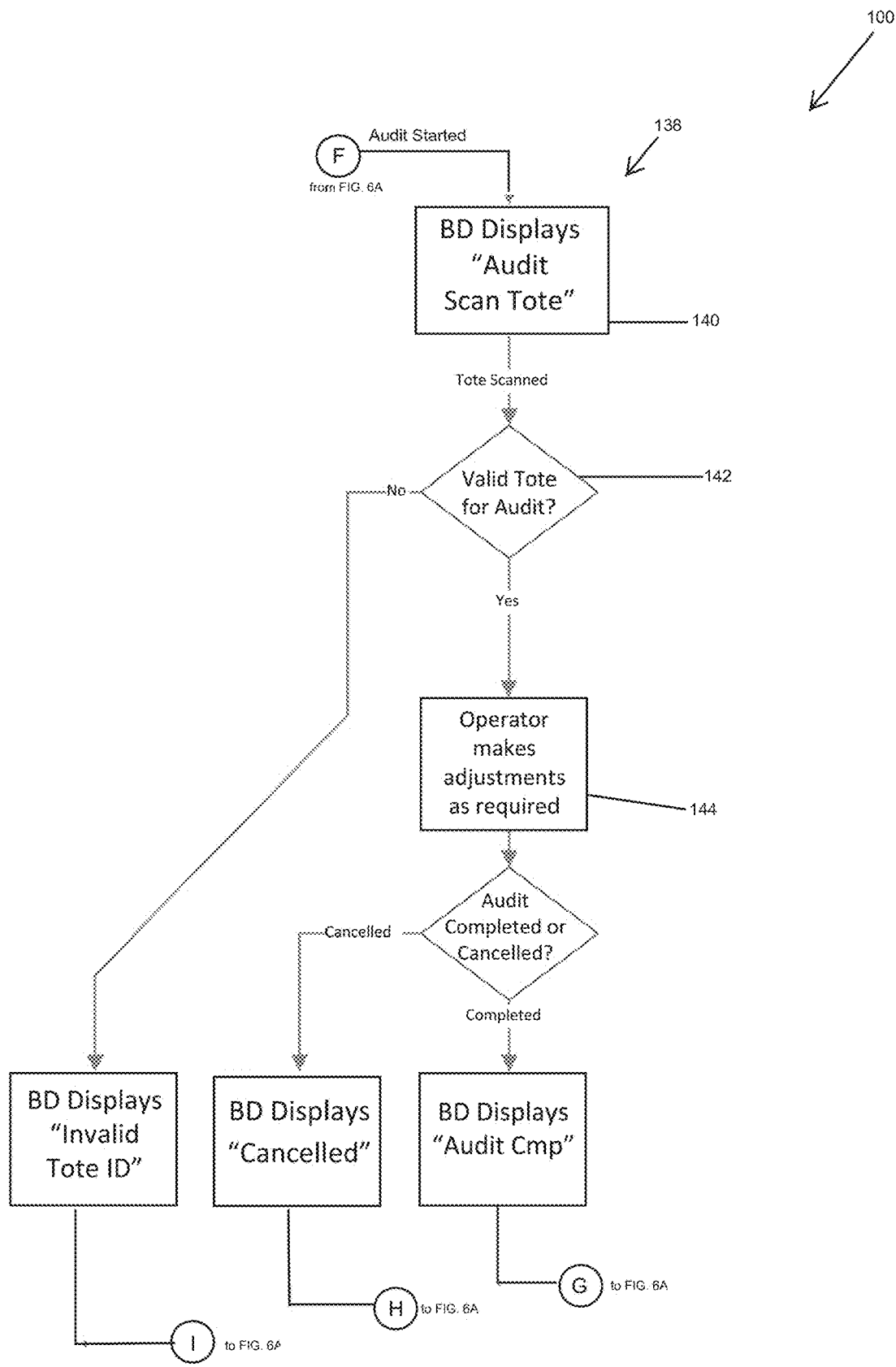
FIG. 6C is a flow chart of an audit process of the pick system.

Furthermore, the system may also include an audit process 138, such as shown in FIG. 6C, that allows the operator or picker to audit the contents of the group of totes to assure that the order has been appropriately filled. Specifically, after the tote is scanned, the operator at step 140 may select the audit process to start and scan the tote for auditing. After the tote is scanned and found to be valid for auditing (step 142), the operator may adjust the contents of the tote based on the display readout as to what should be included in the tote (at step 144). The operator then selects when the audit is completed and the display displays the completed audit message. Also, as the operator performs picks, the picking data is recorded in association with the operator's user identification that is scanned prior to picking. This data can be used to monitor picker performance individually and picking performance of the system overall, such as to provide incentive pay and/or to reorganize the product layout or order makeup.

Optionally, the control system 12, includes information about each product to be picked. For example, control system 12 may include information relating to the volume of the product so that control system 12 can determine how many pieces of a given product can be fit into a particular tote. Although totes 14 are illustrated as having the same dimensions, it should be understood that the size of the totes may be varied, though uniform sizing is preferred. In addition, control system 12 may organize products of an order into groups and associate the groups with totes. As noted above, control system 12 directs operators to pick and place products into a designated tote, preferably a designated tote of a group of totes. Furthermore, the picking stations may be organized by family groups of products so that one family group of products is in one row of picking bays or on one side of the picking aisle and potentially another family group of products is located in another row or on another side of the aisle. In this manner, the system may be adapted to fill totes by family groups. Some stores may wish to have delivered totes that include products grouped by how the products are grouped in the store's aisles.

Figure 7A:
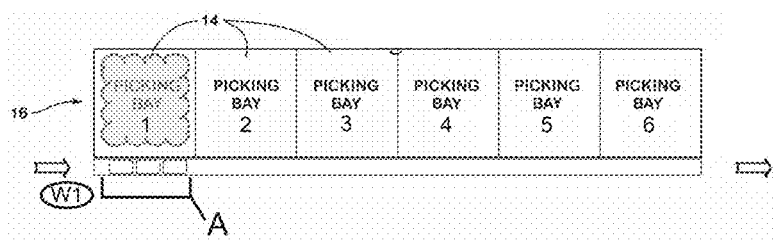
FIGS. 7A-7N illustrate an example of a picking sequence of the pick system, according to an embodiment of the invention.
Figure 7B:
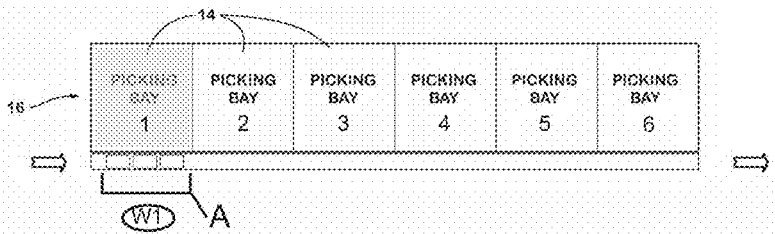
Figure 7C:
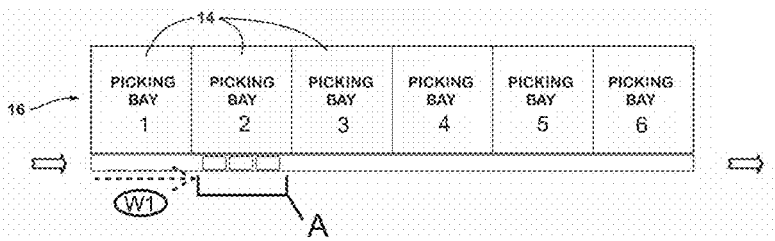
Figure 7D:
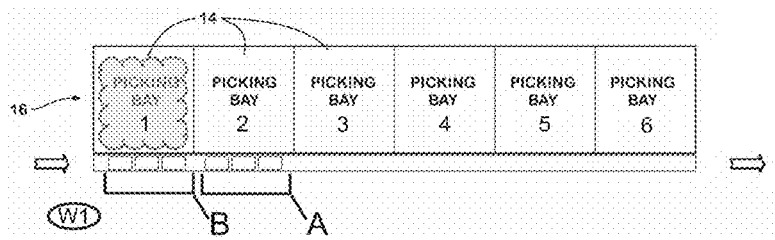
Figure 7E:
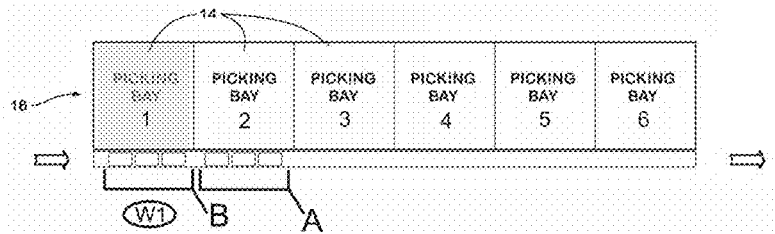
Figure 7F:
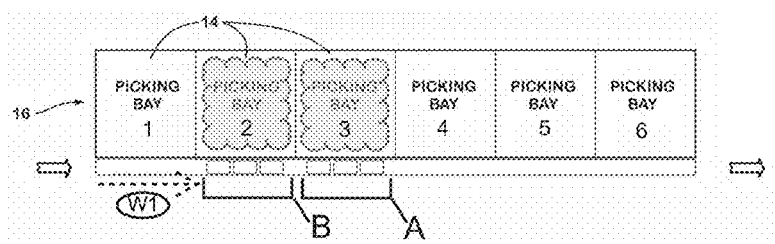
Figure 7G:
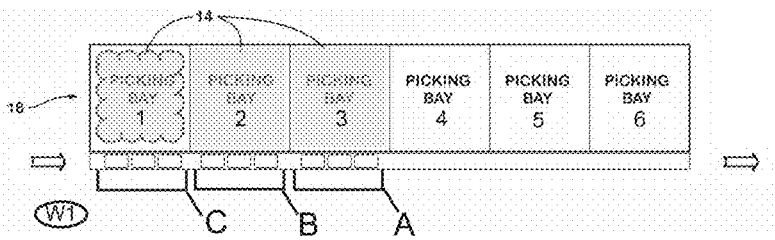
Figure 7H:
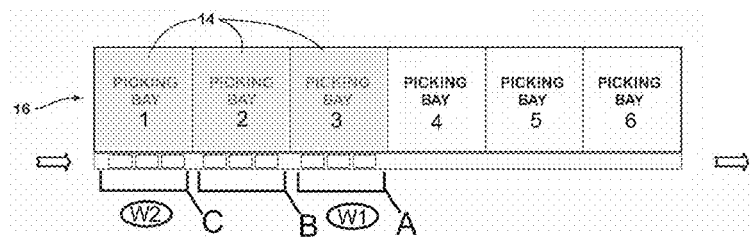
Figure 7I:
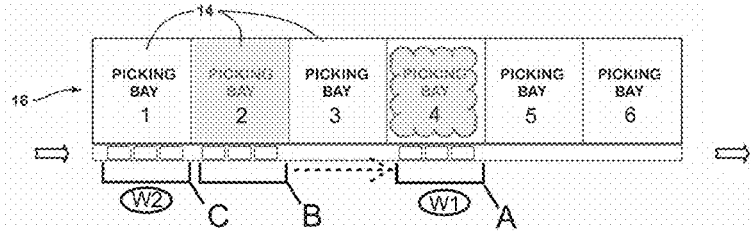
Figure 7J:
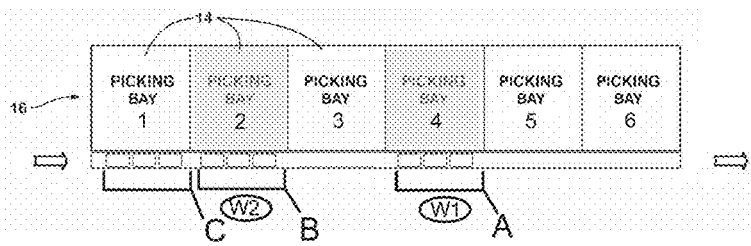
Figure 7K:
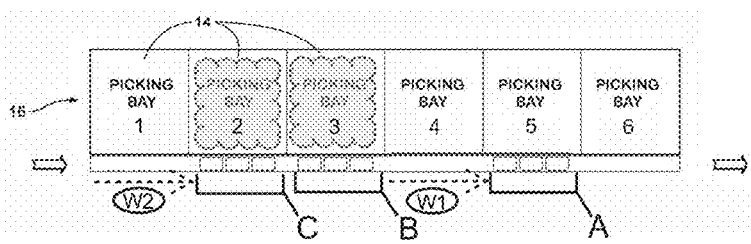
Figure 7L:
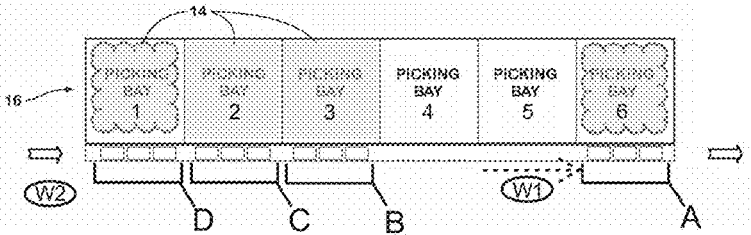
Figure 7M:
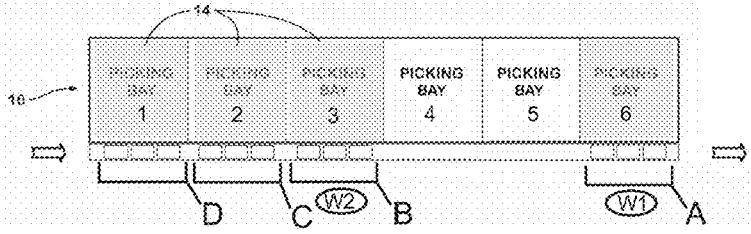
Figure 7N:
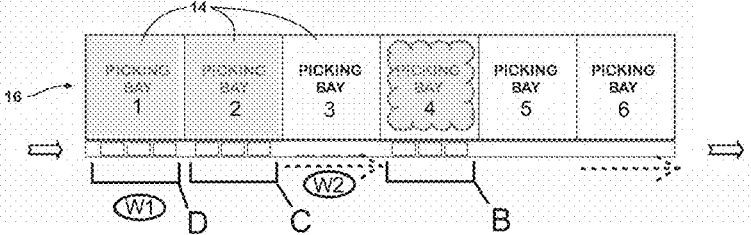

Referring to FIGS. 7A-7N, an exemplary operation of the process is illustrated to show how the totes may move through the system. In the illustrated embodiment shown in FIG. 7A, the operator W1 is logged into picking bay 1 and is inducting a first group of totes (group A) in aisle 16 by placing them in the picking location aligned with picking bay 1 as the totes are scanned. As illustrated in FIG. 7A, the inducted totes of group A have an order that correlates with the products in picking bay 1, such that the picking bay 1 is shown illuminating. Next, as shown in FIG. 7B, the operator W1 starts to complete the picks of the order specified in picking bay 1. Once these picks are complete, as shown in FIG. 7C, the operator W1 moves the totes in group A downstream to picking bay 2. The operator W1 in this case observes that there are no picks available for group A in picking bay 2 and, instead of moving group A further down the row, elects to induct another group of totes (group B) by first scanning his identification card back in at picking bay 1 and inducting group B into picking bay 1. As shown in FIG. 7D picks in picking bay 1 are illuminate due to the inducted totes of group B having an order that correlates with the products in bay 1. Accordingly, the operator W1 again completes the picks in picking bay 1, as shown in FIG. 7E. The operator then moves the totes downstream, moving tote group A to picking bay 3 and tote group B to picking bay 2, as shown in FIG. 7F. In this case, groups A and B have picks in their respective bays 3 and 2 that are illuminated due to having an order that correlates with the products in the respective bay. However, the operator, as shown in FIG. 7G, elects to induct another group of totes (group C) by scanning his identification card back in at picking bay 1 and inducting group C into picking bay 1, which illuminates due to the inducted totes of group C having an order that correlates with the products in bay 1.

With the first three tote groups A, B, C having picks illuminated in their respective picking bays 3, 2, 1, the operator as shown in FIG. 7H, decides to move to picking bay 3 to complete the picks at that bay, by first logging into that picking bay and the picking the products to fulfil the illuminated picks. As the operator W1 is completing the picks at picking bay 3, as shown in FIG. 7I, another operator W2 arrives in row 16 and starts to complete the picks at bay 1, by first logging into picking bay 1 and the picking the products to fulfil the illuminated picks. The operator W1 decides to move with tote group A downstream to picking bay 4, which illuminates picks when the operator W1 scans the totes down to picking bay 4. As the operator W1 completes picks for group A, as shown in FIG. 7J, the operator W2 moves to picking bay 2 and completes the orders for group B. With all illuminate work complete, as shown in FIG. 7K, the operators W1 and W2 move or index the tote groups downstream to the next picking bay, which illuminates picks for tote groups B and C, but not for group A. Accordingly, as shown in FIG. 7L, operator W1 moves group A downstream again to picking bay 6, which illuminates picks for tote group A. At the same time, operator W2 inducts another group of totes (group D) by scanning his identification card back in at picking bay 1 and inducting group D into picking bay 1, which illuminates due to the inducted totes of group D having an order that correlates with the products in bay 1. Now, as shown in FIG. 7M, picks are illuminated for each tote group, where operator W1 completes the picks for group A to finalize the orders for that group and operator W2 scans into picking bay 3 to complete picks for group B. Upon completion of group A, as shown in FIG. 7N, operator W1 moves the totes out of the picking station row and moves upstream past operator W2 to compete picking work at picking bay 1 for tote group D, while operator W2 moves tote group B downstream to picking bay 4, which illuminates products for picking.

This process can be repeated in a variety of ways with more or fewer operators and/or tote groups. The sequence and selections of totes will vary depending on the speed of the respective workers and also the location of the products for the respective totes. In addition, it can be appreciated that the present pick system eliminates the need for zones and, therefore, provides an increase in flexibility over conventional pick systems where operators are assigned and limited to a picking zone. From the foregoing, it should be appreciated that pick system 10 allows operators to freely respond to changes in product order demand concentrations along a given product picking aisle or row, such as to permit pickers to abandon downstream totes and work upstream to address bottlenecks and delays, as well as allow for the seamless addition or subtraction of pickers from a picking aisle or row, without the readjustment of zones or software.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The invention claimed is:

1. A method of picking products in a pick system, said method comprising:
   inducting a group of totes to an initial station of an arrangement of picking stations;
   assigning at least a portion of a product order to at least one tote in the inducted group of totes;
   responsive to the product order of the group of totes identifying a product in a picking station where the group of totes is located, indicating the product to be picked;
   moving the group of totes in a flow direction along the arrangement of picking stations from the initial picking station to downstream adjacent picking stations;
   identifying a user at a picking station; and
   wherein the user picks to a group of totes as that group moves along the flow direction until that user abandons that group of totes by (i) identifying a different user at that group of totes or (ii) identifying that user at a different group of totes.

2. The method of claim 1, wherein the user is identified by scanning a user identification at a picking station to associate the user with that picking station.

3. The method of claim 1, wherein the user elects to either (i) follow the group of totes along the flow direction to the adjacent picking station or (ii) abandon the group of totes to scan the user identification at another picking station to induct new totes or fulfill other product orders.

4. The method of claim 1, wherein, when the user elects to abandon the group of totes, the different user scans a different user identification at the corresponding picking station to pick products and fulfill the product orders for that group of totes.

5. The method of claim 1, wherein the user picks product from the picking station and places it in a designated tote to fulfill the indicated product orders for the group of totes.

6. The method of claim 1, wherein the product is indicated to be picked by illuminating a light at the picking station.

7. The method of claim 1, wherein picking data for the users is recorded in association with the identified user identifications.

8. The method of claim 1, wherein the users are permitted to abandon a group of totes and walk against the flow direction of the totes to an upstream group of totes.

9. The method of claim 1, wherein the products are supported on flow racks that each have a product induct side and a product discharge side, and wherein the products flow on the flow racks from the induct side to the discharge side toward the totes.

10. The method of claim 1, wherein the picking stations each include a light with a numerical indicia for indicating the quantity of the corresponding product to fulfill the product order.

11. The method of claim 1, wherein the arrangement of picking stations is a substantially linear row, and wherein a group of totes is permitted to move in the flow direction along the row of picking stations until the group encounters a picking station that is occupied by a different group of totes or until it passes an end of the row.

12. The method of claim 1, wherein the groups of totes are scanned to register the group at each picking station along the arrangement of picking station.

13. The method of claim 1, wherein each order is assignable to an individual tote.

14. The method of claim 1, wherein the product orders are assigned to the totes based on at least one of the tote destination designation and the tote start location in the arrangement of picking stations.

15. The method of claim 1, wherein a light source is disposed adjacent to each product in the picking station for being illuminated when the product corresponding to the light is identified by the product order assigned to one of the totes in the group of totes located at the picking station.

16. The method of claim 1, wherein the user is automatically logged into the adjacent picking station in response to the product orders being fulfilled for each of the totes in the group of totes in the present picking station.

17. A method of picking products in a pick system, said method comprising:
inducting a group of totes to an initial station of an arrangement of picking stations;
assigning at least a portion of a product order to at least one tote in the inducted group of totes;
responsive to the product order of the group of totes identifying a product in a picking station where the group of totes is located, indicating the product to be picked;
moving the group of totes in a flow direction along the arrangement of picking stations from the initial picking station to downstream adjacent picking stations;
identifying a user at a picking station; and
responsive to the user indicating to audit a tote in the group of tote, displaying at least a portion of the product order of the tote for the user to inspect the contents of the tote and adjust the product contents as necessary to comply with the displayed product order.

18. The method of claim 17, wherein the user picks to a group of totes as that group moves along the flow direction until that user abandons that group of totes by (i) identifying a different user at that group of totes or (ii) identifying that user at a different group of totes.

19. The method of claim 17, wherein the user is identified by scanning a user identification at a picking station to associate the user with that picking station.

20. The method of claim 17, wherein the user elects to either (i) follow the group of totes along the flow direction to the adjacent picking station or (ii) abandon the group of totes to scan the user identification at another picking station to induct new totes or fulfill other product orders.

21. The method of claim 17, wherein, when the user elects to abandon the group of totes, the different user scans a different user identification at the corresponding picking station to pick products and fulfill the product orders for that group of totes.

22. The method of claim 17, wherein the user picks product from the picking station and places it in a designated tote to fulfill the indicated product orders for the group of totes.

23. The method of claim 17, wherein the product is indicated to be picked by illuminating a light at the picking station.

24. The method of claim 17, wherein picking data for the users is recorded in association with the identified user identifications.

25. The method of claim 17, wherein the users are permitted to abandon a group of totes and walk against the flow direction of the totes to an upstream group of totes.

26. The method of claim 17, wherein the products are supported on flow racks that each have a product induct side and a product discharge side, and wherein the products flow on the flow racks from the induct side to the discharge side toward the totes.

27. The method of claim 17, wherein the picking stations each include a light with a numerical indicia for indicating the quantity of the corresponding product to fulfill the product order.

28. The method of claim 17, wherein the arrangement of picking stations is a substantially linear row, and wherein a group of totes is permitted to move in the flow direction along the row of picking stations until the group encounters a picking station that is occupied by a different group of totes or until it passes an end of the row.

29. The method of claim 17, wherein the groups of totes are scanned to register the group at each picking station along the arrangement of picking station.

30. The method of claim 17, wherein the product orders are generated by a control system to be configured for each order to be assignable to an individual tote.

31. The method of claim 17, wherein the product orders are assigned to the totes based on at least one of the tote destination designation and the tote start location in the arrangement of picking stations.

32. The method of claim 17, wherein a light source is disposed adjacent to each product in the picking station for being illuminated when the product corresponding to the light is identified by the product order assigned to one of the totes in the group of totes located at the picking station.

33. The method of claim 17, wherein the user is automatically logged into the adjacent picking station in response to the product orders being fulfilled for each of the totes in the group of totes in the present picking station.

34. A method of picking products in a pick system, said method comprising:

providing at least one row of products disposed in adjacent picking stations, wherein a set of products are available for picking in each picking station;

inducting a group of totes to an initial picking station by scanning a tote identifier for each tote in the group;

assigning a product order to each tote in the inducted group of totes;

responsive to the product order assigned to the tote matching a product from the set of products at the picking station at which the tote is located, illuminating a light adjacent to the corresponding product for alerting a picker of the product to fulfill the product order;

scanning a first user identification at a picking station that is associated with a location of a first picker, wherein the first picker picks and places a desired quantity of the product to fulfill the product order at the picking station for each tote in the group of totes;

wherein, when the order for each tote in the group of totes is fulfilled or does not match any of the products at the picking station, the group of totes are moved in a flow direction along the row of products away from the initial picking station to an adjacent picking station;

scanning at least one tote identifier in the group of totes to register the group of totes at the adjacent picking station;

wherein the first picker elects to either follow the group of totes along the flow direction of the group of totes to the adjacent picking station or abandon the group of totes to scan the first user identification at another picking station to induct a new group of totes or pick and fulfill a product order for another group of totes; and wherein, when the first picker elects to abandon the group of totes, a second picker scans a second user identification at the adjacent picking station to pick and fulfill the product order for the group of totes.

35. A pick system comprising:

an arrangement of picking stations that have a plurality of products for picking;

a group of totes that are each configured to be moved in a flow direction along the arrangement of picking stations from an initial picking station to downstream picking stations;

a controller configured to induct the group of totes to an initial station in the arrangement of picking stations by identifying at least one tote in the group and assigning at least one product order to the group;

wherein the controller is configured to indicate a product at a picking station in response to the controller identifying the product from the product order of group of totes located at the picking station; and wherein the controller is configured to identify a user with a group of totes at a picking station and successive downstream adjacent picking stations for that group until (i) a different user is identified at that group of totes or (ii) that user is identified at a different group of totes.

36. A pick system comprising:

an arrangement of picking stations that have a plurality of products for picking;

a group of totes that are each configured to be moved in a flow direction along the arrangement of picking stations from an initial picking station to downstream picking stations;

a controller configured to induct the group of totes to an initial station in the arrangement of picking stations by identifying at least one tote in the group and assigning at least one product order to the group;

wherein the controller is configured to indicate a product at a picking station in response to the controller identifying the product from the product order of group of totes located at the picking station;

wherein the controller is configured to identify a user with a group of totes at a picking station; and a display at the picking station is in communication with the controller and is configured, in response to the user indicating to audit a tote in the group of totes, to display at least a portion of the product order of the tote for the user to inspect the contents of the tote and adjust the product contents as necessary to comply with the displayed product order.

* * * * *